3,459,786
PREPARATION OF AMINO ESTERS OF UNSATURATED POLYCARBOXYLIC ACIDS
Thomas K. Brotherton and John W. Lynn, Charleston, W. Va., assignors to Union Carbide Corporation, a corporation of New York
No Drawing. Continuation-in-part of application Ser. No. 212,481, July 25, 1962. This application Aug. 9, 1965, Ser. No. 478,440
Int. Cl. C07c 93/24, 93/00, 93/16
U.S. Cl. 260—468
15 Claims This application is a continuation-in-part of application Ser. No. 212,481, now abandoned, entitled "Novel Amino Esters of Olefinically Unsaturated Polycarboxylic Acids and Process for Preparation," by T. K. Brotherton and J. W. Lynn, filed July 25, 1962, said continuation-in-part application being assigned to the same assignee as the instant application.

This invention relates, in general, to novel diamines and to a process for their preparation. In one aspect, this invention relates to a new class of esters of olefinically unsaturated polycarboxylic acids having at least two primary amino groups and novel salts thereof.

The novel compounds of this invention can be conveniently represented by the following general formula:

I
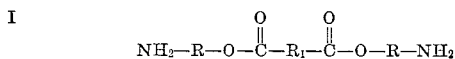
$$NH_2-R-O-\overset{O}{\underset{\|}{C}}-R_1-\overset{O}{\underset{\|}{C}}-O-R-NH_2$$

wherein R represents a divalent substituted and unsubstituted aliphatic group which preferably contains from 2 to 10 carbon atoms, or a divalent substituted and unsubstituted cycloaliphatic group which preferably contains from 4 to 10 carbon atoms; and wherein $R_1$ represents a divalent olefinically unsaturated aliphatic, cycloaliphatic, or bicycloaliphatic group, preferably a divalent olefinically unsaturated hydrocarbon group which contains from 2 to 24 carbon atoms, and preferably still alkenylene. Preferred R variables include alkylene, alkenylene, alkynylene, cycloalkylalkylene, cycloalkenylalkylene, arylalkylene, cycloalkylene, cycloalkenylene, alkylcycloalkylene, alkylcycloalkenylene, alkylenecycloalkylene, and cycloalkylenealkylene.

Additionally, the present invention encompasses the diamine salts of the aforementioned novel compounds having the formula:

II
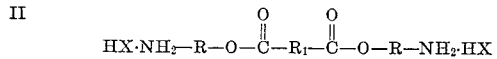
$$HX \cdot NH_2-R-O-\overset{O}{\underset{\|}{C}}-R_1-\overset{O}{\underset{\|}{C}}-O-R-NH_2 \cdot HX$$

wherein R and $R_1$ have the same value as previously defined and HX represents hydrogen chloride, hydrogen bromide, or mineral acids such as sulfuric, phosphoric, and the like.

The novel compounds of this invention are multifunctional in that each compound contains at least two primary amino groups in the molecule and at least one olefinic group in the polycarboxylic acid moiety of said molecule. Due to the presence of the amino groups, the novel compounds of this invention are useful as curing agents for epoxy resins, and as intermediates for the preparation of numerous chemical compounds. In particular, the compositions of this invention are useful in the preparation of novel diisocyanate esters of polycarboxylic acids and related compounds. Moreover, the presence of an olefinic group in the polycarboxylic acid moiety of the ester imparts many new and unobvious features to the diamine molecule. For instance, the olefinic group can react with vinyl monomers to form amine-containing polymers or it can undergo a Diels-Alder reaction with 1,3-dienes to form other novel diamines.

It is, accordingly, an object of the present invention to provide novel diamines and salts thereof which are suitable for use in the plastic and resin field. Another object is to provide novel compositions of matter comprising the amino esters of olefinically unsaturated polycarboxylic acids and novel salts thereof. Another object of this invention is to provide novel esters containing at least two primary amino groups. A further object of the present invention is to provide novel compounds having polyfunctional properties. A still further object of the present invention is to provide a novel process for the preparation of the aforesaid novel compositions. These and other objects will readily become apparent to those skilled in the art in the light of the teachings herein set forth.

Various useful and attractive subclasses of the novel ester diamine compounds include the following: bis-(aminoalkyl) alkenedioates, bis(aminoalkenyl) alkenedioate, bis(aminocycloalkyl) alkenedioate, bis(aminocycloalkenyl) alkenedioate, bis(aminoalkyl) cycloalkenedicarboxylate, bis(aminoalkenyl) cycloalkenedicarboxylate, bis(aminocycloalkyl) cycloalkenedicarboxylate, bis-(aminocycloalkenyl) cycloalkenedicarboxylate, bis-(aminoalkyl) bicycloalkenedicarboxylate, bis(aminoalkenyl) bicycloalkenedicarboxylate, bis(aminocycloalkyl) bicycloalkenedicarboxylate, bis(aminocycloalkenyl) bicycloalkenedicarboxylate, and the like. With reference to the above, it is preferred that the "aminoalkyl" and "aminoalkenyl" groups contain from 2 to 10 carbon atoms, that the "aminocycloalkyl" and "aminocycloalkenyl" groups contain from 4 to 10 carbon atoms, that the "alkenedioate" group contains from 4 to 26 carbon atoms, that the "cycloalkenedicarboxylate" group is cyclohexenedicarboxylate, and that the "bicycloalkenedicarboxylate" group is 5-norbornene-2,3-dicarboxylate.

Specific illustrative ester diamine compounds include bis(2-aminoethyl) fumarate, bis(3-aminopropyl) glutaconate, bis(4-aminobutyl) alpha-hydromuconate, bis(5-aminopentyl) beta-hydromuconate, bis(7-aminoheptyl) itaconate, bis(8-aminooctyl) 2-cyclohexene-1,4-dicarboxylate, bis(9-aminononyl) 4-cyclohexene-1,2-dicarboxylate, bis(10 - aminodecyl) 5 - norbornene - 2,3 - dicarboxylate, bis(2-amino-1-methylethyl) fumarate, bis(2,2-dimethyl - 3 - aminopropyl) fumarate, bis(3 - ethyl - 5 - aminopentyl) glutaconate, bis(3,4-diethyl-5-aminopentyl) alpha - hydromuconate, bis(4,4 - dimethyl - 6 - aminohexyl) beta - hydromuconate, bis(2 - methyl - 4 - ethyl - 6-aminohexyl) itaconate, 2-aminoethyl 3-aminopropyl glutaconate, 4-aminobutyl 6-aminohexyl alpha-hydromuconate, 3-aminopropyl 8-aminooctyl beta-hydromuconate, bis(4-amino-2-butenyl) glutaconate, bis(4-amino-2-butenyl) itaconate, bis(7-amino-4-heptenyl) fumarate, bis(3-ethyl-5-amino-3-pentenyl) fumarate, bis(3,4-dimethyl-5-amino-3-pentenyl) glutaconate, bis(2-methyl-4-ethyl-6-amino-2-hexenyl) itaconate, 4-amino-2-butenyl 3-aminopropyl fumarate, 4-amino-2-butenyl 5-amino-3-pentenyl glutaconate, bis(7-amino-4-heptynyl) fumarate, bis(10-amino-4-decynyl) glutaconate, bis(2-phenyl-3-aminopropyl) fumarate, bis(3-naphthyl-5-aminopentyl) fumarate, bis(3 - styryl - 5 - aminopentyl) glutaconate, bis(4 - tolyl - 6-aminohexyl) itaconate, bis(5-xylyl-8-aminooctyl) fumarate, bis(7-mesityl-9-aminononyl) glutaconate, bis(2-cyclohexyl-3-aminopropyl) itaconate, bis(4-cyclohexyl-6-aminohexyl) fumarate, bis(5-cyclohexylmethyl-7-aminoheptyl) glutaconate, bis(2-aminocyclobutyl) fumarate, bis(3 - aminocyclopentyl) fumarate, bis(4 - aminocyclohexyl) glutaconate, bis(5-aminocycloheptyl) itaconate, bis(6-aminocyclooctyl) 2-cyclohexene-1,4-dicarboxylate, bis(7 - aminocyclononyl) alpha - hydromuconate, bis(3 - amino - 4 - cyclopentenyl) beta - hydromuconate, bis - (4 - amino - 5 - cyclohexenyl) 4 - cyclohexene - 1,2 - dicarboxylate, bis-(5-amino-6-cycloheptenyl) fumarate, bis(6-amino-7-cyclooctenyl) fumarate, bis(2-aminocyclobutylmethyl) glutaconate, bis(2-amino-2-ethylcyclobutyl) itaconate, bis(3-aminocyclopentylmethyl) fumarate, bis(3-amino-2-ethylcyclopentyl) glutaconate, bis[3(2'-aminoethyl)cyclopentyl] itaconate, bis(3-amino-5-methylcyclohexyl) fumarate, bis(3 - amino - 5,6 - dimethylcyclohexyl) glutaconate, bis(3-amino-4-ethylcyclopentyl) itaconate, bis(3 - amino - 4,5 - diethylcyclopentyl) fumarate, bis(4-amino-5-methyl-2-cyclohexenyl) 5-norbornene-2,3-dicarboxylate, bis(2-aminoethyl) 5-norbornene-2,3-dicarboxylate, bis(2-amino-1-methylethyl) 5-norbornene-2,3-dicarboxylate, bis(3-aminopropyl) 5-norbornene-2,3-dicarboxylate, bis(8-aminooctyl) 5-norbornene-2,3-dicarboxylate, and the like. Of course, the corresponding ester salts as exemplified by Formula II above are likewise included in the preceding illustrative compounds.

In accordance with the novel process, the novel ester diamines and salts thereof can be produced in relatively high yields by the reaction of the hydroxy amine salt, contained in an inert normally liquid reaction medium, with an olefinically unsaturated polycarboxylic acid halide, at a temperature which does not exceed the temperature at which the salt dissociates, and thereafter recovering the corresponding polyester amine salt.

In general, there are several factors which are critical to the successful preparation of the instant compounds. Firstly, it is necessary that the amino group of the hydroxy amine be eliminated as a reaction site in order to obtain exclusive reaction of the hydroxyl groups with the polycarboxylic acid halide. Secondly, the particular products obtained from the reaction of salts of hydroxy amines and acid halides are critically dependent upon the reaction temperature employed.

In practice, it has been found that the amino groups of the hydroxy amine starting material as well as the resulting ester diamine, can be successfully shielded as a reaction site by the formation of the hydroxy amine salt prior to the reaction with the acid halide. The salt, preferably the hydrochloride, can be formed and subsequently isolated prior to use, or employed directly without isolation. In the latter instance, solvents should be used which will remain inert during the reaction with the acid halide. When the hydroxy amine salt is not to be isolated, it is usually necessary to conduct the neutralization in the solvent with gaseous hydrogen chloride at elevated temperatures in order to obtain a salt of satisfactory purity. When the hydroxy amine salt is to be isolated, it is preferred to effect neutralization in a solvent in which the hydroxy amine is soluble, such as, for example, chloroform, dimethyl ether of ethylene glycol, tetrahydrofuran, dioxane, and the like. In such circumstances, neutralization can be satisfactorily conducted at room temperature.

The reaction of the hydroxy amine salt and acid halide is preferably conducted within the temperature range of from about 65° C. to about 150° C. At a reaction temperature below 65° C., substantially all the starting material was recovered. The preferred operating temperature range was from about 65° C. to 95° C. wherein optimum yield of the ester diamine dihydrohalide was recovered. In general, the temperature necessary to produce the ester diamine dihydrohalide will be dependent upon both the melting point and the basicity of the particular hydroxy amine starting material. In actual practice, it has been found that the optimum yield will be obtained at a temperature which does not exceed the temperature at which the particular hydroxy amine hydrohalide would dissociate to the free amine under the conditions employed. Thus, while the reaction is critically dependent upon the reaction temperature, the actual temperature employed will not necessarily be the same for each starting material. As a general rule, however, the reaction temperature will usually fall within the range of from about 65° to about 150° C.

Pressure is not necessarily critical and the instant process can be conducted at atmospheric, subatmospheric or superatmospheric pressures.

In general, the process of the present invention, the conversion of the hydroxy amine salt to the corresponding ester diamine dihydrohalide is accomplished in an inert, normally liquid reaction medium, at the aforementioned reaction temperature. The liquid reaction medium employed in the conversion of the hydroxy amine salt to the corresponding novel ester diamine dihydrohalide must be inert to the reactants and stable under the conditions employed. Moreover, it should be easily separable from the resulting ester diamine dihydrohalide. Typical inert, liquid organic vehicles which have been found suitable in the novel process include, among others, the aromatic hydrocarbons such as toluene, xylene, naphthalene, tetrahydronaphthalene, benzene, diphenyl, cymene, amylbenzene; the cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methyl isobutyl ketone, methyl hexyl ketone, diisopropyl ketone and others such as tetramethylene sulfone, and the like.

Although the novel process preferably is conducted with olefinically unsaturated polycarboxylic acid polychlorides, in its broadest concept the process includes the utilization of any polycarboxylic acid polyhalide such as the polyfluoride or polybromide. However, for economic considerations the acid chloride is the preferred reactant.

Inasmuch as the yield and rate of formation of diamine are dependent upon several variables, for example, concentration of the hydroxy amine salt, solubility of the hydroxy amine salt and acid halide in the reaction medium, reaction temperature, pressure, and rate of addition of the acid halide, no hard and fast rule can be devised regarding the optimum conditions to be employed.

In a preferred embodiment, the novel process is effected by saturating, with gaseous hydrogen chloride, a toluene solution which contains the hydroxy amine in a concentration of from about 10 to about 40 weight percent is saturated with gaseous hydrogen chloride. Thereafter, the polycarboxylic acid chloride is added over a period of approximately 60 minutes while the temperature of the mixture is raised from about 65° C. to 95° C. After removal of by-product hydrogen chloride and the solvent, a crude ester diamine dihydrochloride is obtained which can be recovered by filtration and refined by known purification techniques such as washing and the like. The free ester diamine can be obtained by basification of the corresponding dihydrohalide.

Although the reaction of the hydroxy amine salt in an inert, normally liquid reaction medium in the absence of a hydrogen chloride acceptor is the most economically attractive process, the use of tertiary amines having basic strengths somewhat less than the hydroxy amine as acceptors for the by-product halide often result in time and temperature advantages over the direct process.

The starting materials for the production of the novel ester diamines and salts of the present invention, as hereinbefore indicated, are the corresponding salts of hydoxy compounds having primary amino groups and olefinically unsaturated polycarboxylic acid halides. The hydroxy amine salts can be conveniently represented by the following general formula:

(III) 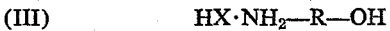

wherein R has the same value as previously indicated and HX represents hydrogen chloride, hydrogen bromide, or mineral acids such as sulfuric, phosphoric, and the like. Other acids can also be utilized but hydrochloric acid is preferred.

Illustrative amino alcohol salts include, for example, the hydrohalide salts of various primary amino alcohols such as: 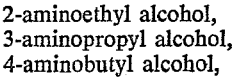

2-aminoethyl alcohol,
3-aminopropyl alcohol,
4-aminobutyl alcohol, 5-aminopentyl alcohol,
7-aminoheptyl alcohol,
8-aminooctyl alcohol,
9-aminononyl alcohol,
10-aminodecyl alcohol,
2-methyl-3-aminopropyl alcohol,
2,2-dimethyl-3-aminopropyl alcohol,
3-ethyl-5-aminopentyl alcohol,
3,4-diethyl-5-aminopentyl alcohol,
4,4-dimethyl-6-aminohexyl alcohol,
2-methyl-4-ethyl-6-aminohexyl alcohol,
9-aminononyl alcohol,
4-amino-2-butenyl alcohol,
4-amino-2-butenyl alcohol,
5-amino-3-pentenyl alcohol,
7-amino-4-heptenyl alcohol,
8-amino-4-octenyl alcohol,
9-amino-5-nonenyl alcohol,
10-amino-6-decenyl alcohol,
5-amino-2-butynyl alcohol,
7-amino-4-decynyl alcohol,
2-phenyl-3-aminopropyl alcohol,
3-naphthyl-5-aminopentyl alcohol,
3-styryl-5-aminopentyl alcohol,
4-tolyl-6-aminohexyl alcohol,
6-cumenyl-7-aminoheptyl alcohol,
5-xylyl-8-aminooctyl alcohol,
7-mesityl-9-aminonyl alcohol,
2-cyclohexyl-3-aminopropyl alcohol,
5-cyclohexylmethyl-7-aminoheptyl alcohol,
3-cyclohexenyl-5-aminopentyl alcohol,
2-aminocyclobutyl alcohol,
3-aminocyclopentyl alcohol,
4-aminocyclohexyl alcohol,
5-aminocycloheptyl alcohol,
6-aminocyclooctyl alcohol,
4-amino-5-cyclohexenyl alcohol,
5-amino-6-cycloheptenyl alcohol,
2-aminocyclobutylmethyl alcohol,
3-aminocyclopentylmethyl alcohol,
5-aminocycloheptylmethyl alcohol
3-amino-5-methylcyclohexyl alcohol,
3-amino-4,5-diethylcyclopentyl alcohol,
4-amino-5-methyl-2-cyclohexenyl alcohol,
and the like.

The olefinically unsaturated polycarboxylic acid halides suitable for use in preparing the novel compositions of this invention include those having from 4 to 26 carbon atoms and more preferably 4 to 20 carbon atoms. Illustrative compounds include, among others, the halides of maleic, fumaric, glutaconic, alpha-hydromuconic, beta-hydromuconic, itaconic, 2-octenedioic, 2,5-heptadienedioic, 2-cyclohexene-1,4-dicarboxylic, 4-cyclohexene-1,2-dicarboxylic, 5-norbornene-2,3-dicarboxylic and the like. Acid halides other than the chloride can be employed but inasmuch as the hydroxy amine salt is preferably utilized as the chloride, the common chloride anion is preferred.

The following examples are illustrative:

Example I.—Bis(2-aminoethyl) fumarate dihydrochloride

Phosgene was sparged through a mixture of monoethanolamine hydrochloride (194 grams, 2.0 mols), and maleic anhydride (98 grams, 1.0 mol) in 1168 grams of ethylene dichloride at a rate of 0.25 mole per mole of anhydride per hour for a period of 11 hours with the kettle temperature being maintained at 75–80° C. The resultant crude product was isolated, washed with ether and methanol and finally dried. The refined product was obtained in 35 percent yield (95 grams) with a melting point of 200–202° C. Upon analysis the product had the following properties: Calculated for $C_8H_{14}N_2O_4Cl_2$: N, 10.18. Found: N, 10.33. The infrared spectrum was in agreement with that of the assigned structure for the subject compound with maxima at $3.35\mu$ ($NH_3^+$); $3.7\mu$, $3.85\mu$, and $4.0\mu$ (amine hydrochloride); $5.8\mu$ (ester C=O); $6.08\mu$ (C=C); $6.27\mu$ and $6.7\mu$ ($NH_3^+$); $7.9\mu$ and $7.95\mu$ (C—O as in fumarate); and 12.3 (fumarate).

Upon basification of the bis(2-aminoethyl) fumarate dihydrochloride the free ester diamine is recovered.

Example II.—Bis(2-aminoethyl) fumarate dihydrochloride

Phosgene was sparged through a stirred mixture of monoethanolamine hydrochloride (989 grams, 10.02 mol) and maleic anhydride (490 grams, 5.0 mol) in 2095 grams of orthodichlorobenzene at a rate of .02 mole per mole of anhydride per hour for a period of 10 hours with the kettle temperature being maintained at 75–85° C. The crude product was isolated, washed with ether and methanol and finally dried. The refined product was obtained in a yield of 1259 grams which represented 91.5 percent of the theoretical value. The infrared spectrum was in agreement with that of the assigned structure.

Upon basification of the bis(2-aminoethyl) fumarate dihydrochloride the free ester diamine is recovered.

Example III.—Bis(2-aminoethyl) fumarate dihydrochloride

A mixture of monoethanolamine hydrochloride (194 grams, 2.0 mols), furamoyl chloride (153 grams, 1.0 mol), and toluene (1380 grams) was maintained at 80–90° C. for a period of 46 hours at which time no further evolution of HCl was detected. The resulting solid product was isolated, washed with ethers and methanol and finally dried. The refined product which had a melting point of 206° C. was obtained in 70 percent yield (193 grams). Upon analysis the product had the following properties: Calculated for $C_8H_{16}N_2O_4Cl_2$: C, 34.92; H, 5.86; N, 10.18; and Cl, 25.77. Found: C, 34.34; H, 5.85; N, 10.20; and Cl, 26.00. Infrared spectrum was in agreement with that of the assigned structure for the subject compound with maxima at $3.3\mu$, $3.85\mu$, $4.12\mu$, and $4.97\mu$ ($NH_3$); $6.1\mu$ (C=C); and $5.8\mu$ (C=O).

Upon basification of the bis(2-aminoethyl) fumarate dihydrochloride the free ester diamine is recovered.

Example IV.—Bis(2-aminoethyl) fumarate dihydrochloride

A mixture of monoethanolamine hydrochloride (97 grams, 1.0 mol), maleic anhydride (49 grams, 0.5 mol) and xylene (436 grams) was maintained at the reflux temperature, about 138° C. while anhydrous HCl was sparged through the mixture at a rate of 0.6 mol per mol anhydride per hour and by-product water was removed overhead. The theoretical quantity of water (9.0 cubic centimeters) was collected in 15 hours and the residue product subsequently isolated, washed with ether and methanol and finally dried. 46 grams of refined product was isolated which represented 33 percent of the theoretical value. The bis(2-aminoethyl) fumarate dihydrochloride had a melting point of 197° C. The infrared spectrum was in agreement with that of the assigned structure.

Upon basification of the bis(2-aminoethyl) fumarate dihydrochloride the free ester diamine is recovered.

Example V.—Bis(2-aminoethyl) 5-norbornene-2,3-dicarboxylate dihydrochloride

A mixture of monoethanolamine hydrochloride (97.5 grams, 1.0 mol) 5-norborene-2,3-dicarbonyl chloride, and 824 grams of toluene was maintained at 80–110° C for a period of 49 hours at which time the evolution of HCl had ceased. The solid product was isolated from the reaction medium, washed with ether, then methanol and subsequently dried. The refined product (95 grams) had a melting range of 180–195° C. and represented 56 percent of the theoretical value. The infrared spectrum was in agreement with that of the assigned structure.

Upon basification of the bis(2-aminoethyl) 5-norbornene-2,3-dicarboxylate dihydrochloride the free ester diamine is recovered.

Although the invention has been illustrated by the preceding examples it is not to be construed as limited to the materials employed therein, but rather, the invention encompasses the generic area as hereinbefore disclosed. Various modifications and embodiments of this invention can be made without departing from the spirit and scope thereof.

What is claimed is:

1. The salts of the diamines represented by the following formula:

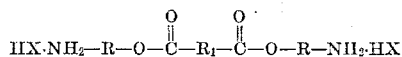

wherein R represents a divalent hydrocarbon radical of the group consisting of an aliphatic group of 2 to 10 carbon atoms and a cycloaliphatic group of 4 to 10 carbon atoms; wherein $R_1$ represents a divalent olefinically unsaturated hydrocarbon radical of 2 to 24 carbon atoms selected from the group consisting of aliphatic, cycloaliphatic, and bicycloaliphatic groups; and wherein HX is of the group consisting of hydrogen chloride, hydrogen bromide, sulfuric acid, and phosphoric acids.

2. Bis(aminoalkyl) alkenedioate dihydrohalide wherein each aminoalkyl moiety contains from 2 to 10 carbon atoms, and wherein the alkenedioate moiety contains from 4 to 26 carbon atoms.

3. Bis(aminoalkyl) cyclohexenedicarboxylate wherein each aminoalkyl moiety contains from 2 to 10 carbon atoms.

4. Bis(aminoalkyl) cyclohexenedicarboxylate dihydrohalide wherein each aminoalkyl moiety contains from 2 to 10 carbon atoms.

5. Bis(aminoalkyl) 5-norbornenedicarboxylate wherein each aminoalkyl moiety contains from 2 to 10 carbon atoms.

6. Bis(aminoalkyl) 5 - norbornenedicarboxylate dihydrohalide wherein each aminoalkyl moiety contains from 2 to 10 carbon atoms.

7. Bis(omega - aminoalkyl) fumarate dihydrochloride wherein each aminoalkyl moiety contains from 2 to 10 carbon atoms.

8. Bis(2-aminoethyl) fumarate.

9. Bis(2-aminoethyl) fumarate dihydrochloride.

10. Bis(2-amino-1-methylethyl) fumarate.

11. Bis(2-amino-1-methylethyl) fumarate dihydrochloride.

12. Bis(2-aminoethyl) 4 - cyclohexene-1,2-dicarboxylate.

13. Bis(2-aminoethyl) 4-cyclohexene-1,2-dicarboxylate dihydrochloride.

14. Bis(2-aminoethyl) 5-norbornene-2,3-dicarboxylate.

15. Bis(2-aminoethyl) 5-norbornene-2,3-dicarboxylate dihydrochloride.

References Cited

UNITED STATES PATENTS

| 2,449,926 | 9/1948 | Cahn | 260—468 |
| 2,626,278 | 1/1953 | Wystrach | 260—479 |
| 2,797,232 | 6/1957 | Bunge | 260—471 |

FOREIGN PATENTS

| 835,891 | 5/1960 | Great Britain. |
| 514,413 | 7/1955 | Canada. |
| 970,075 | 8/1958 | Germany. |

OTHER REFERENCES

Sasaki et al.: Chem. Abstracts, vol. 45 (1951), pp. 2214g. QD1.A51, Soc. Japan, vol. 18, pp. 54–58 (1942).

LORRAINE A. WEINBERGER, Primary Examiner

P. J. KILLOS, Assistant Examiner

U.S. Cl. X.R.

260—485